(12) United States Patent
Walters

(10) Patent No.: US 6,329,627 B1
(45) Date of Patent: Dec. 11, 2001

(54) ELECTRODE FOR PLASMA ARC TORCH AND METHOD OF MAKING THE SAME

(75) Inventor: Jeffrey K. Walters, Bradenton, FL (US)

(73) Assignee: American Torch Tip Company, Bradenton, FL (US)

( * ) Notice: Subject to any disclaimer, the term of this patent is extended or adjusted under 35 U.S.C. 154(b) by 0 days.

(21) Appl. No.: 09/695,973

(22) Filed: Oct. 26, 2000

(51) Int. Cl.$^7$ .................................................... B23K 10/00
(52) U.S. Cl. .................... 219/121.52; 219/121.5; 219/121.51; 219/121.59
(58) Field of Search ........................... 219/121.52, 121.5, 219/121.59, 121.51, 121.36, 121.48, 145.1, 145.21, 74, 75, 118, 119; 313/231.31, 231.41, 231.51

(56) References Cited

U.S. PATENT DOCUMENTS

| | | |
|---|---|---|
| 3,930,139 | 12/1975 | Bykhovsky et al. ................. 219/145 |
| 5,023,425 | 6/1991 | Severance, Jr. . |
| 5,676,864 | 10/1997 | Walters . |
| 5,767,478 | 6/1998 | Walters . |

*Primary Examiner*—Teresa Walberg
*Assistant Examiner*—Quang Van
(74) *Attorney, Agent, or Firm*—Sughrue, Mion, Zinn, Macpeak & Seas, PLLC

(57) ABSTRACT

An electrode for supporting an arc in a plasma arc torch. The electrode includes a metallic holder having a cavity formed in a front end portion. An insert assembly is mounted in the cavity. The insert assembly includes an emissive insert composed of a metallic material having a relatively low work function. The emissive insert has a bore formed therein for securing a non-emissive core. The core has a base portion, which provides an interface between the emissive insert and the holder. The core and base portion act to thermally conduct heat out of the emissive insert so that the service life of the emissive insert is increased by the lowering of the emissive insert's operating temperature.

15 Claims, 4 Drawing Sheets

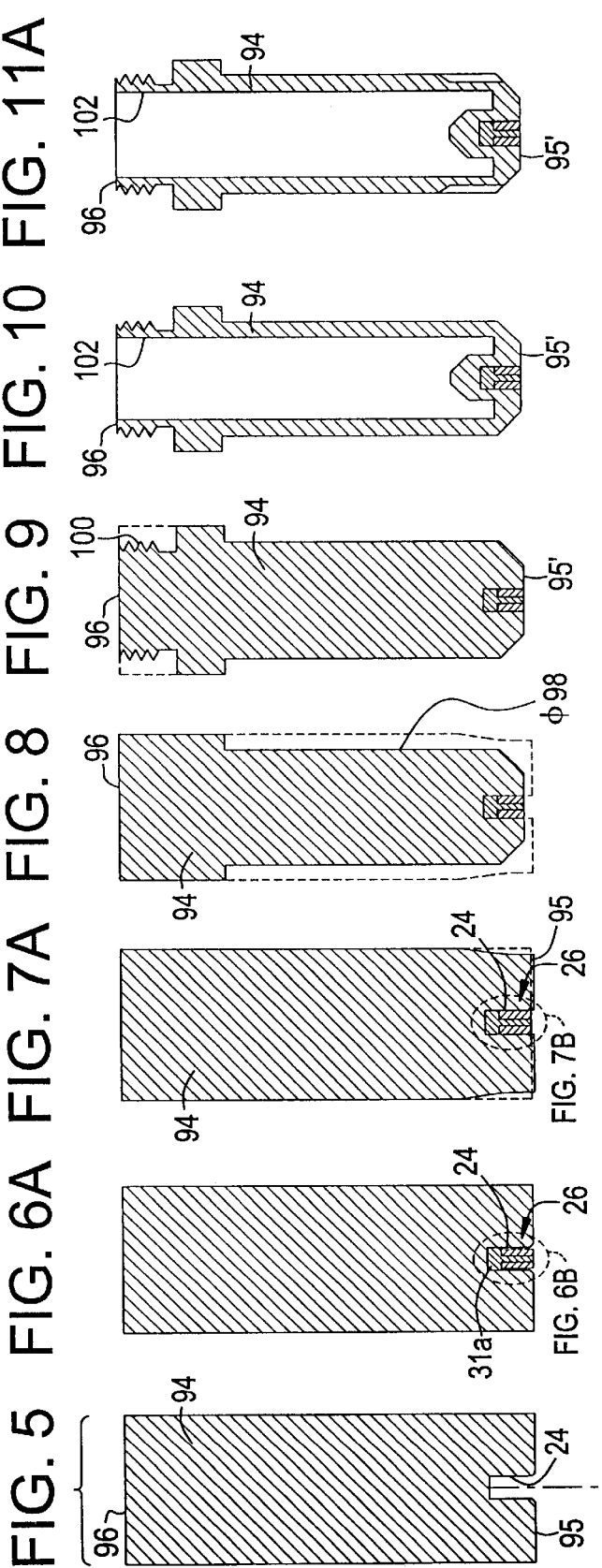

ELECTRODE FOR PLASMA ARC TORCH AND METHOD OF MAKING THE SAME

BACKGROUND OF THE INVENTION

The present invention relates to a plasma arc torch and, more particularly, to a novel electrode for use in a plasma arc torch having an improved service life and a method of making the same.

Commonly used for working of metals, plasma arc torches are used for cutting, welding, surface treatment, melting and annealing. These torches include an electrode that supports an arc that extends from the electrode to the workpiece in the transferred arc mode of operation. It is also conventional to surround the arc with a swirling vortex of gas, and in some torch designs, it is conventional to envelope the gas and arc with a swirling jet of water.

The electrode used in a conventional torch of the type described typically comprises an elongate tubular member composed of a material of high thermal conductivity, such as copper or copper alloy. The forward or discharge end of the tubular electrode includes a bottom end wall having an emissive insert embedded therein, which supports the arc. The insert is composed of a material which has a relatively low work function, which is defined in the art as the potential step, measured in electron volts, which permits thermionic emission from the surface of a metal at a given temperature. In view of its low work function, the insert is thus capable of readily emitting electrons when an electrical potential is applied thereto, and commonly used insert materials include hafnium, zirconium, and tungsten.

One of the major problems connected with the torches referred to above is the shortness of service life of their electrodes, especially when the torches are used with an oxidizing arc gas, such as oxygen or air. In those torches, the gas appears to rapidly oxidize the copper, and as the copper oxidizes, its work function fails. As a result, the oxidized copper that surrounds the insert begins to support the arc in preference to the insert. After this occurs, the copper melts, thereby causing early destruction and/or failure of the electrode.

U.S. Pat. No. 5,023,425 (Severance, Jr.) which issued on Jun. 11, 1991, and which is incorporated herein by reference, discloses an electrode for a plasma arc torch wherein the electrode includes a copper holder having a lower end which mounts an emissive insert that acts as the cathode terminal for the arc during operation. A sleeve of silver is positioned to surround the insert and forms an annular ring on the lower end surface of the holder to surround the exposed end face of the emissive insert. The annular ring serves to prevent arcing from the copper holder, and maintains the arc on the insert. However, while the silver sleeve of the '425 patent was intended to prolong the life of the copper holder, in practice, this electrode suffers from problems in that the wear does not come from double arcing, but from the hafnium overheating and eroding.

U.S. Pat. No. 3,930,139 (Bykhovsky et al.) which issued on Dec. 30, 1975, and which is incorporated herein by reference, also discloses an electrode for plasma arc working of materials. In the '139 patent, the holder is again formed from copper or copper alloys and an active insert is fastened to the end face of the holder and is in thermal and electrical contact with the holder through a metal distance piece disposed between the active insert and the holder and over the entire contact surface area. The metal distance piece is formed from aluminum or aluminum alloys and the active insert is formed from hafnium or from hafnium with yttrium and neodymium oxides as dopants therein taken separately or in combination. However, while the aluminum sleeve surrounding the active insert in the '139 patent serves to protect the copper holder surrounding the active insert, the aluminum distance piece or sleeve offers no advantages over the silver sleeve of the '425 patent to Severance, Jr.

U.S. Pat. No. 5,676,864 (Walters) which issued on Oct. 14, 1997, which is incorporated herein by reference, discloses an electrode for a plasma arc torch wherein the electrode includes a copper holder having a lower end which mounts an emissive insert that acts as the cathode terminal for the arc during operation. A sleeve of silver is positioned substantially to surround the insert and form an annular ring on the lower end surface of the holder to surround the exposed end face of the emissive insert. The insert assembly further includes an aluminum face plate disposed in the enlarged outer portion of the cavity and which is exposed at the front end of the metallic holder so as to surround a front portion of the sleeve.

U.S. Pat. No. 5,767,478 (Walters) which issued on Jun. 16, 1998, alternatively teaches eliminating the aluminum face plate of U.S. Pat. No. 5,676,864 and instead provides for the front end of the holder to directly contact the emissive insert forming an overlay portion of the holder between the front face thereof and the sleeve, thus protecting the silver sleeve.

SUMMARY OF THE INVENTION

An electrode for supporting an arc in a plasma arc torch, according to the present invention includes, a metallic holder having a front end, and a cavity in the front end. An insert assembly is mounted in the cavity and comprises an emissive insert having an inner face, an outer face, and a bore formed therein. The emissive insert is composed of a metallic material having a relatively low work function. The insert assembly further has a non-emissive core positioned within the bore that acts to draw heat out of the emissive insert. The core has a base portion that substantially covers the inner face of the emissive insert forming an interface between the emissive insert and the metallic holder. This interface aids in transferring heat from the emissive insert to the metallic holder.

The metallic holder is generally tubular and has a front end wall which defines an outer front face, wherein the outer face of the emissive insert and an end portion of the non-emissive insert lie in the plane of the outer front face of the metallic holder.

It is also contemplated that the electrode further comprises a sleeve which surrounds at least a portion of the emissive insert so as to separate the portion of the emissive insert from contact with the holder. The sleeve being composed of a metal which is selected from the group consisting of silver, gold, platinum, rhodium, iridium, palladium, nickel, and alloys thereof.

An embodiment of the invention additionally includes an overlay portion formed in the metallic holder at the front end. The overlay portion directly contacts the emissive insert so that none of the sleeve is exposed at the front end.

It is also contemplated that an embodiment of the present invention includes, a nozzle mounted adjacent the transverse front end wall of the electrode and having a bore therethrough which is aligned with the longitudinal axis. A power supply is also provided, which creates an electrical arc extending from the emissive insert of the electrode through the bore and to a workpiece located adjacent the nozzle. Additionally, gas inlet holes may be provided for generating a vortical flow of a gas between the electrode and the nozzle and so as to create a plasma flow outwardly through the bore and to the workpiece.

The invention also includes a method of fabricating an electrode adapted for supporting an arc in a plasma arc torch, which comprises, creating a bore in a substantially cylindrical emissive material and positioning in the bore, a non-emissive core, having a base, to form an insert assembly. The method further includes preparing a cylindrical metallic blank and forming a first cavity in an end portion of the blank. The insert assembly is then pressed into the first cavity of the blank so that the base of the core interfaces between the cylindrical emissive material and the blank. The blank is swaged so that the insert assembly is bound to the cylindrical metallic blank. Finally, threads are formed on an end distal to the front end, and a second cavity is formed by a boring and grooving process.

The method further contemplates forming an overlay portion in the first cavity and inserting a sleeve within the cavity, which surrounds at least a portion of the insert assembly, wherein the overlay portion directly contacts the emissive material so that none of the sleeve is exposed at the front end.

Features of the electrode of the present invention include adaptability for use in a plasma arc torch of the type described. The invention also provides a significant advantage from the perspective of improved service life when the torch is used in an oxidizing atmosphere

BRIEF DESCRIPTION OF THE DRAWINGS

Some of the advantages of this invention have already been listed above, others will be discussed as this description proceeds, when considered together with the accompanying drawings, in which:

FIGS. 5–11B are schematic views illustrating the steps of the method of fabricating the electrode of FIG. 3, in accordance with the present invention.

DETAILED DESCRIPTION OF THE PREFERRED EMBODIMENTS

Figure 1:
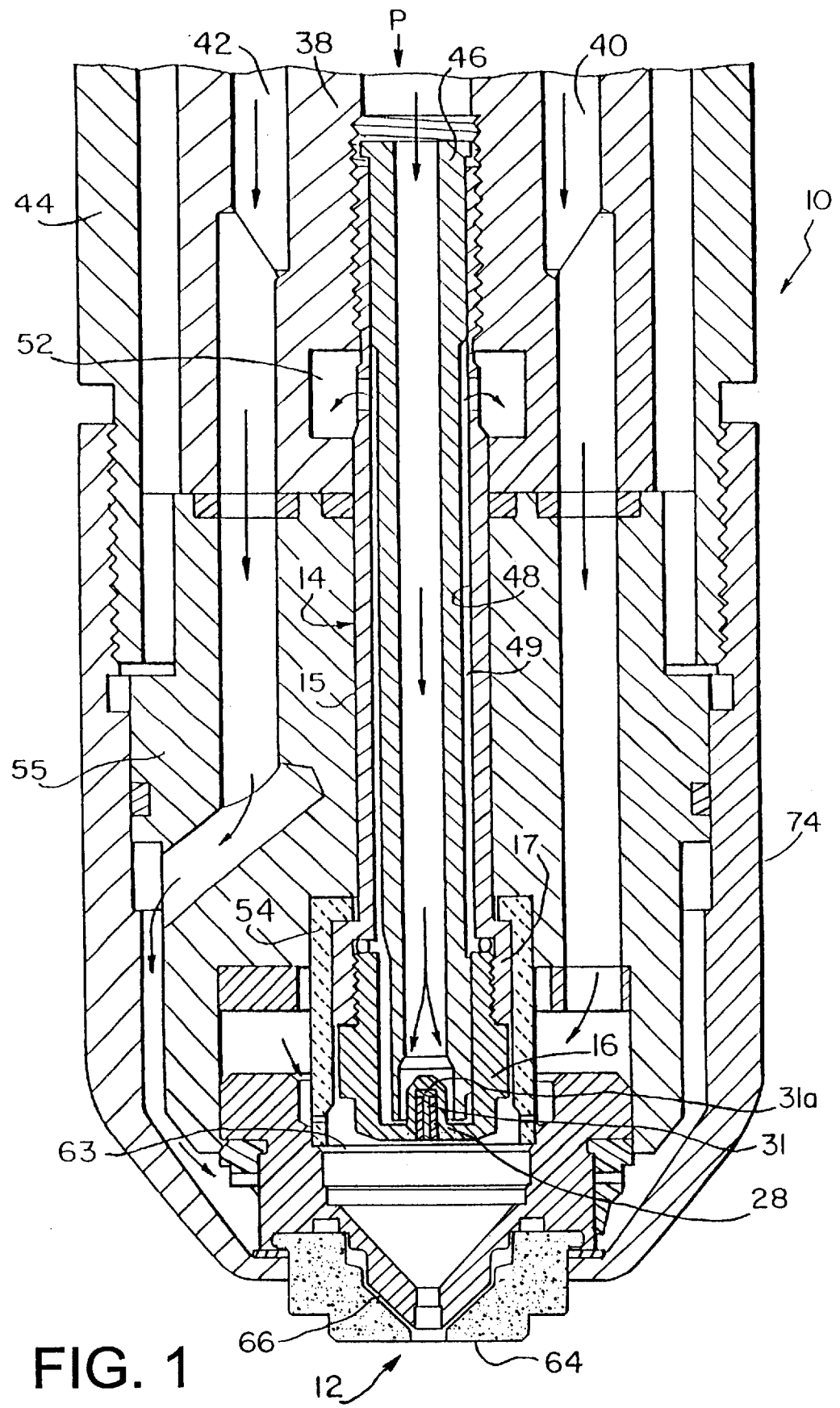
FIG. 1 is a sectional side view of a plasma arc torch, which embodies the features of the present invention.

In FIG. 1, a plasma arc torch 10 is shown which includes a nozzle assembly 12 and a tubular electrode 14. The electrode 14 is made preferably of copper or a copper alloy, and it is composed of an upper tubular member 15 and a lower, cup-shaped member or holder 16. More specifically, the upper tubular member 15 is of elongate open tubular construction and it defines the longitudinal axis of the torch. The upper tubular member 15 also includes an internally threaded lower end portion 17.

Figure 2:
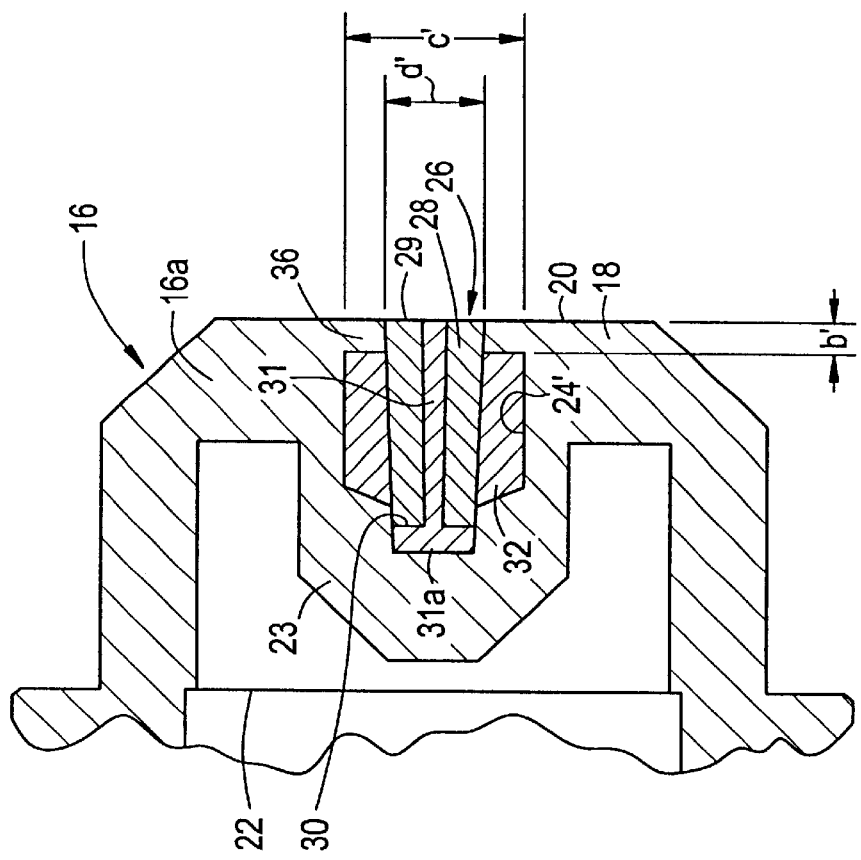
FIG. 2 is a fragmentary, sectional view of the electrode of the present invention and which is used in the plasma arc torch shown in FIG. 1.

With additional reference to FIG. 2, the holder 16 is also of tubular construction, and includes a lower body area 16a. A transverse front end wall 18 closes the front end of the holder 16, defining an outer front face 20. The rear end of the holder 16 is machined to be externally threaded and is threadedly joined to the lower end portion 17 of the upper tubular member 15.

The holder 16 is formed from a blank, such as copper, and is open at the rear end thereof. The holder 16 has a cup-shaped configuration and defines an internal cavity 22 formed by a boring and grooving process. Also, the transverse front-end wall 18 of the holder includes a cylindrical post 23, which extends rearwardly into the internal cavity 22 and along the longitudinal axis. In addition, a generally cylindrical cavity 24 is formed in the lower body area 16a of the holder 16 and extends rearwardly along the longitudinal axis and into a portion of the length of the post 23.

An insert assembly 26 is provided and comprises a generally cylindrical emissive insert 28 having a bore 27 formed therein. The emissive insert 28 has a circular outer end face 29 and a circular inner face 30. A non-emissive core 31, such as silver, is positioned inside the bore 27. The core 31 has a base 31a formed on an end portion thereof, so that upon assertion of the core 31 into the bore 27, the base 31a rests on the circular inner face 30 of the emissive insert 28. The bore 27 forms corners with the outer end face 29 and inner end face 30 of the emissive insert 28, having preferably, but not necessarily, radiuses between 0.003–0.005 inches. Likewise, the base 31a has preferably, but not necessarily, matching radiuses so as to form a close fit with the emissive insert 28.

The emissive insert 28 is composed of a metallic material which has a relatively low work function, in a range between about 2.7 to 4.2 ev, so that it is adapted to readily emit electrons upon an electrical potential being applied thereto. Suitable examples of such materials are hafnium, zirconium, tungsten and alloys thereof.

The insert assembly 26 is positioned coaxially along the longitudinal axis in the cavity 24 of the holder 16 using a pressing process. The base portion 31a of the core 31 forms an interface between the circular inner face 30 of the emissive insert 28 and the holder 16. In operation, the core 31 and base 31a work as a conductive element to transfer heat to the holder 16 resulting in less heat build up in the emissive insert 28.

Figure 3:
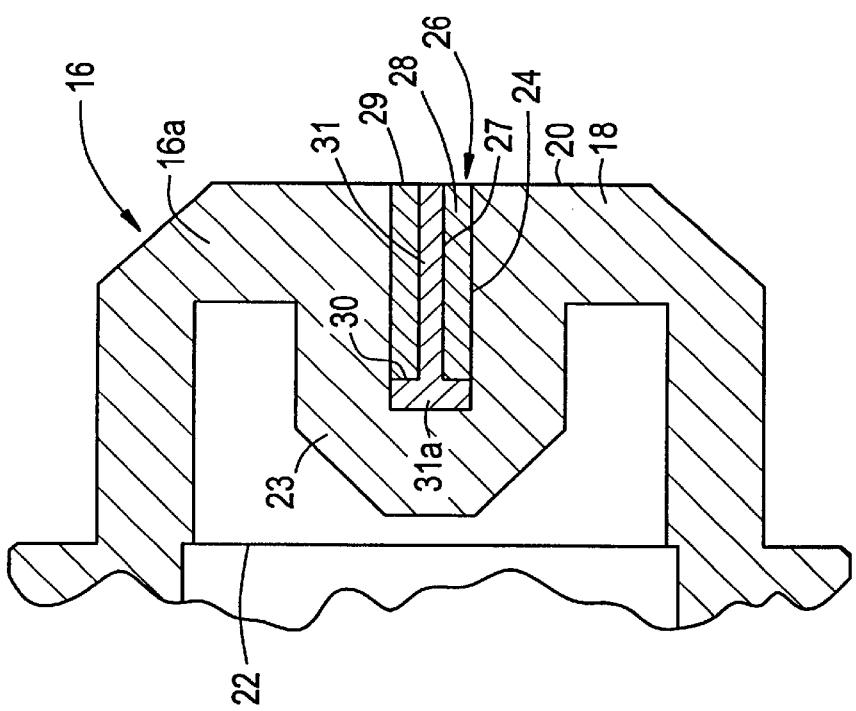
FIG. 3 is a fragmentary, sectional view showing another embodiment of the electrode of the present invention and which is used in the plasma arc torch shown in FIG. 1.

An alternative embodiment is illustrated in FIG. 3 and has a relatively non-emissive sleeve 32 positioned in the cavity 24' coaxially about the emissive insert 28. The sleeve 32 has a peripheral wall, which is metallurgically bonded to the walls of the cavity 24'.

The sleeve 32 is composed of a metallic material having a work function which is greater than that of the material of the holder 16, and also greater than that of the material of the emissive insert 28. In this regard, it is preferred that the sleeve be composed of a metallic material having a work function of at least about 4.3 ev. Several metals and alloys are suitable for the non-emissive sleeve 32 of the present invention. Such metals include silver, gold, platinum, rhodium, iridium, palladium, nickel, and alloys thereof. A summary of some of the properties of the above-noted materials are indicated in U.S. Pat. No. 5,023,425, which was previously incorporated by reference.

In further accord with the alternative embodiment, the metallic holder 16 forms an overlay portion 36. The overlay portion 36 is also discussed in detail in U.S. Pat. No. 5,767,478, the disclosure of which is incorporated by reference into this description. The overlay portion directly contacts the emissive insert 28 so that no portion of the sleeve 32 is exposed at the front face 20 of the holder 16. The overlay portion 36 of the copper holder 16 between the front face 20 thereof and the silver sleeve 32 preferably, but not necessarily, has a thickness b' of 0.010 inches. The sleeve 32 preferably, but not necessarily, has an outer diameter c' of 0.130 inches. The circular outer end face 29 of the emissive insert 28 preferably, but not necessarily, has a diameter d' of 0.086 inches. Further, the axial length of the emissive insert 28 is preferably, but not necessarily, 0.203 inches, while the axial length of the silver sleeve is preferably, but not necessarily, 0.164 inches. Of course, these dimensions are given by way of example and are not intended to limit the present invention.

The electrode according to the above described embodiment of the present invention provides a significantly improved service life. More specifically, the silver (and other suitable materials described in detail above) sleeve 32 provides good conductivity and a cooler flow of electricity to the emissive insert 28 (formed of, for example, hafnium). Adding to the cooling effect of the emissive insert 28 is the core 31 and the base 31*a*, according to the present invention, which both act to draw heat out of the emissive insert 28. Thus, the emissive insert 28 is able to have a longer service life since it can be maintained at a cooler temperature.

The following table demonstrates the criticality of the present invention by comparing a number of different electrode configurations. All of the electrodes tested included an emissive insert formed of hafnium. The very first test, for example, is described as utilizing "silver surrounding hafnium" and refers to a silver sleeve surrounding a hafnium emissive insert, whereas "silver in hafnium" refers to the hafnium emissive insert having a silver stem and base according to the invention. The tests were conducted by making piercings of flagpoles having lengths of 45 feet. The thickness of the material used for the tests varied from ⅜" to 1". Piercings of the metal were conducted until the electrode failed or was considered worn out by the operator.

TABLE

| Test Number | Description of Electrode | Pierces | Plate Thickness |
|---|---|---|---|
| 1 | Silver surrounding hafnium | 502 | ⅜" |
| 1 | Silver surrounding hafnium | 487 | ⅜" |
| 1 | Silver surrounding hafnium | 515 | ⅜" |
| 1 | Silver in hafnium | 637 | ⅜" |
| 1 | Silver in hafnium | 596 | ⅜" |
| 1 | Silver in hafnium | 621 | ⅜" |
| 2 | Silver surrounding hafnium | 65 | 1" |
| 2 | Silver surrounding hafnium | 72 | 1" |
| 2 | Silver surrounding hafnium | 74 | 1" |
| 2 | Silver in hafnium | 151 | 1" |
| 2 | Silver in hafnium | 137 | 1" |
| 2 | Silver in hafnium | 143 | 1" |

Based on the above results of the piercing tests, it is apparent that the electrode configuration according to the present invention has a substantially longer operating life than the conventional electrode assembly.

FIGS. 5–11B illustrate a preferred method of fabricating the electrode holder of the present invention. As shown in FIG. 5, a cylindrical blank 94 of copper or copper alloy is provided, which has a front face 95 and an opposite rear face 96. A cavity is then formed in the front face 95, such as by drilling, which creates the above described cavity 24.

The emissive insert 28 is formed having the bore 27 provided longitudinally therein. The non-emissive core 31 is formed, which may, for example, be composed essentially of silver, and which is configured and sized to substantially fit within the bore 27. The base 31*a* of the core 31 rests on the outer end face 29 of the emissive insert 28 forming the insert assembly 26.

Next, the insert assembly 26 is pressed into the cavity 24, as shown in FIGS. 6A and 6B. The insert assembly is placed into the cavity 24 with the base 31*a* end entered first. After the insert assembly 26 is inserted into the cavity 24, with reference to FIGS. 7A and 7B, the front face 95 end of the blank 94 undergoes a swaging process wherein the insert assembly 26 is bonded to the cylindrical blank 94.

As shown in FIGS. 8 and 9, the blank is turned to provide a first diameter body portion 98, and an externally threaded portion 100, which is formed on the rear face 96 end of the cylindrical blank 94. With reference to FIGS. 10 and 11A, the method further includes axially boring and grooving the blank 94 from the rear face 96 end to form a second cavity 102. The front face 95' of the assembly is then preferably finished by a hex milling procedure, the result of which is shown in FIG. 11B.

The method also contemplates, as shown in FIG. 3, the insertion of the sleeve 32, which is positioned such that the overly portion 36 directly contacts the emissive insert 28 so that none of the sleeve 32 is exposed at the front face 95.

The remaining plasma arc torch structure is conventional and is disclosed in the '425 patent mentioned above. More specifically, as shown in FIG. 1, the electrode 14 is mounted in a plasma arc torch body 38, which has gas and liquid passageways 40 and 42, respectively. The torch body 38 is surrounded by an outer insulated housing member 44.

The tube 46 is suspended in the central bore 48 of the electrode 14 for circulating a liquid medium such as water through the electrode structure 14. The tube 46 is of a diameter smaller than the diameter of the central bore 48 so as to provide a space 49 for the water to flow upon discharge from the tube 46. The water flows from an unshown source through the tube 46 and back through the space 49 to the opening 52 in the torch body 38 and to an unshown drain hose. The passageway 42 directs the injection water into the nozzle assembly 12 where it is converted into a swirling vortex for surrounding the plasma arc. The electrode 14 upon being connected to the torch body 38 holds in place the ceramic gas baffle 54 and a high temperature plastic-insulating member 55. The member 55 electrically insulates the nozzle assembly 12 from the electrode 14.

Figure 4:
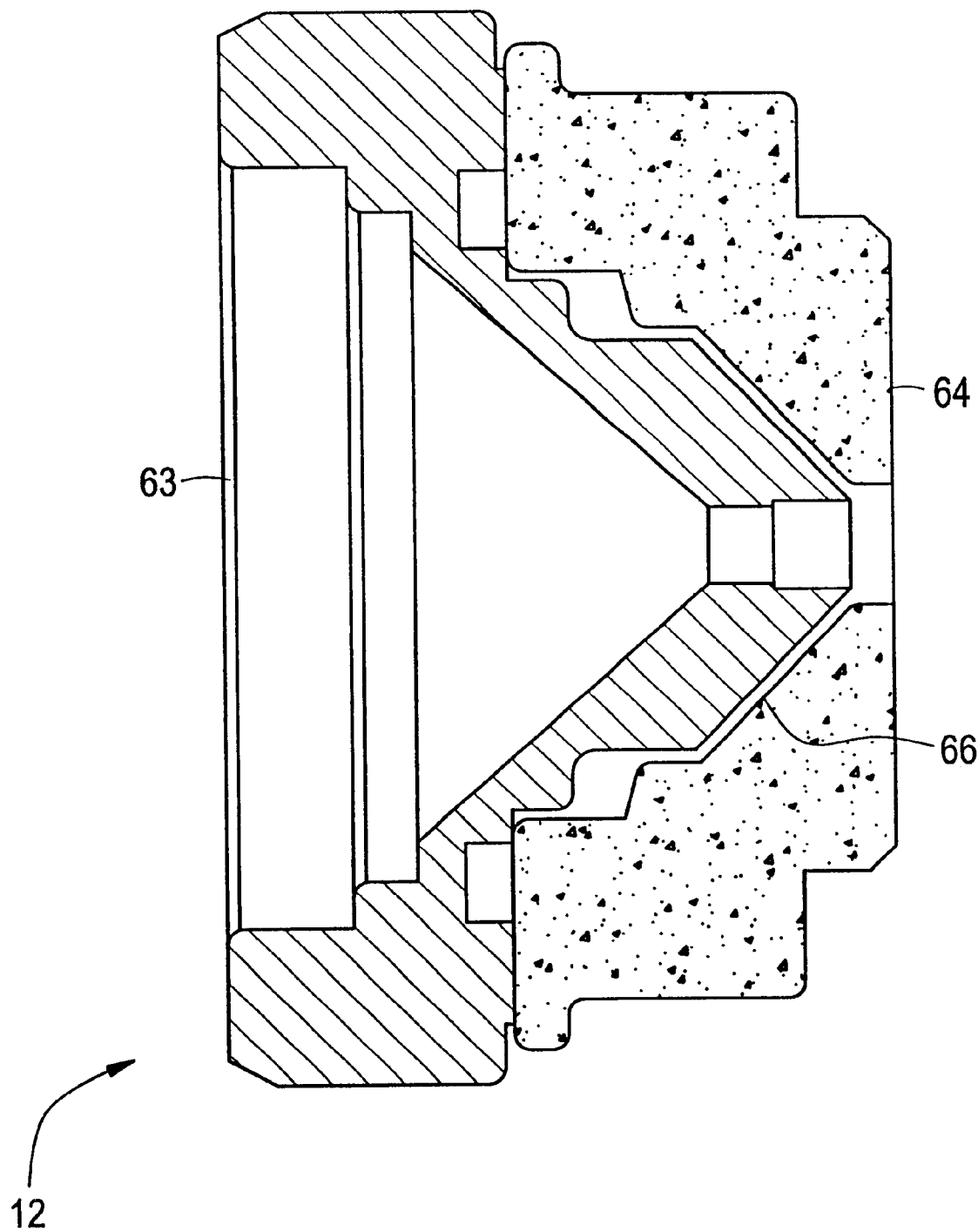
FIG. 4 is a fragmentary, sectional view showing a nozzle used in the plasma arc torch in accordance with the present invention.

With additional reference to FIG. 4, the nozzle assembly 12 comprises an upper nozzle member 63 and a lower nozzle member 64. The upper nozzle member 63 is preferably metal. A ceramic material, such as alumina or lava, is preferred for the lower nozzle member 64. The lower nozzle member 64 is separated from the upper nozzle member 63 by a swirl passageway 66.

A power supply P is connected to the torch electrode 14 in a series circuit relationship with a metal workpiece, which is typically grounded. In operation, the plasma arc is established between the emissive insert of the torch 10 which acts as the cathode terminal for the arc, and the workpiece which is connected to the anode of the power supply, and which is positioned below the lower nozzle member 64. The plasma arc is started in a conventional manner by momentarily establishing a pilot arc between the electrode 14 and the nozzle assembly 12.

It is contemplated that numerous modifications may be made to the electrode for plasma arc torch and method of making the same of the present invention without departing from the spirit and scope of the invention as defined in the following claims.

What is claimed is:

1. An electrode for supporting an arc in a plasma arc torch, said electrode comprising:

a metallic holder having a front end, and a cavity in said front end; and an insert assembly mounted in said cavity and comprising:

an emissive insert having an inner face, an outer face, and a bore formed therein, said emissive insert composed of a metallic material having a relatively low work function; and a non-emissive core positioned within said bore, said non-emissive core having an end portion, wherein said non-emissive core acts to draw heat out of said emissive insert and transfer the heat to said metallic holder.

2. The electrode as claimed in claim 1, wherein said non-emissive core further includes a base portion that covers said inner face of said emissive insert, and forms an interface between said emissive insert and said metallic holder, wherein said interface acts to transfer heat between said emissive insert and said metallic holder.

3. The electrode as claimed in claim 1, wherein said metallic holder is generally tubular and has a front end wall which defines an outer front face, and wherein said outer end face of said emissive insert and said end portion of said non-emissive insert lie in a plane of said outer front face of said metallic holder.

4. The electrode as claimed in claim 2, further comprising a sleeve which surrounds at least a portion of said emissive insert so as to separate said portion of said emissive insert from contact with said metallic holder, said sleeve being composed of a metal which is selected from the group consisting of silver, gold, platinum, rhodium, iridium, palladium, nickel, and alloys thereof; and further including an overlay portion at said front end, said overlay portion directly contacting said emissive insert so that none of said sleeve is exposed at said front end.

5. The electrode as defined in claim 4, wherein said sleeve has a peripheral surface, which is bonded to walls of said cavity.

6. The electrode as claimed in claim 4, wherein said overlay portion of said metallic holder has a thickness of about 0.010 inches.

7. The electrode as claimed in claim 2, wherein said metallic holder comprises a metal selected from the group consisting of copper and copper alloys.

8. The electrode as claimed in claim 2, wherein said emissive insert comprises a metal selected from the group consisting of hafnium, zirconium, tungsten, and alloys thereof.

9. The electrode as claimed in claim 2, wherein said non-emissive core is silver.

10. A plasma torch comprising:

an electrode including a metallic elongate tubular holder defining a longitudinal axis and having a front end wall, said transverse front end wall having a substantially planar outer front face which is perpendicular to said longitudinal axis, a cavity formed in said outer front face along said longitudinal axis, and an insert assembly mounted in said cavity and which comprises:

(a) a generally cylindrical emissive insert, having a bore formed therein, disposed coaxially along said longitudinal axis and having an outer end face lying in the plane of said outer front face of said holder, and an inner end face distal to said outer end face, said emissive insert being composed of a metallic material having a relatively low work function so as to be adapted to readily emit electrons upon an electric potential being applied thereto;

(b) a non-emissive core positioned within said bore of said emissive insert, said non-emissive core having a base portion that substantially covers said inner end face of said emissive insert and acts as an interface between said emissive insert and said holder to transfer heat to said holder; and a nozzle mounted adjacent said transverse front end wall of said electrode and having a bore therethrough which is aligned with said longitudinal axis; and a power supply, which creates an electrical arc extending from said emissive insert of said electrode through said bore and to a workpiece located adjacent said nozzle.

11. The plasma torch of claim 10, wherein said holder includes a sleeve positioned in said cavity coaxially about at least a portion of said emissive insert, said sleeve being composed of a metallic material having a work function of at least about 4.3 ev and which is greater than that of the material of said emissive insert, said sleeve being selected from the group consisting of silver, gold, platinum, rhodium, iridium, palladium, nickel, and alloys; and an overlay portion at said front end wall, said overlay portion directly contacting said emissive insert so that none of said sleeve is exposed at said front end wall.

12. The plasma torch of claim 10, wherein said non-emissive core and base comprise silver.

13. A method of fabricating an electrode adapted for supporting an arc in a plasma arc torch, which comprises:

creating a bore in a substantially cylindrical emissive material;

positioning a non-emissive core, having a base, within said bore to form an insert assembly;

providing a cylindrical metallic blank having a front end and forming a first cavity in said front end;

pressing said insert assembly into said first cavity of said blank so that said base of said core interfaces between said cylindrical emissive material and said blank;

swaging said blank so that said insert assembly is bound to said cylindrical metallic blank;

forming threads on a portion of said blank distal to said front end; and boring and grooving said blank to provide a second cavity.

14. The method of claim 13, further comprising forming an overlay portion in said first cavity.

15. The method of claim 13, further comprising inserting a sleeve within said first cavity which surrounds at least a portion of said insert assembly, wherein said overlay portion directly contacts said insert assembly so that none of said sleeve is exposed at said front end.

* * * * *